(12) United States Patent
Diamond et al.

(10) Patent No.: US 10,870,433 B2
(45) Date of Patent: Dec. 22, 2020

(54) EMERGENCY ROUTE PLANNING SYSTEM

(71) Applicant: Ford Global Technologies, LLC, Dearborn, MI (US)

(72) Inventors: Brendan Diamond, Grosse Pointe, MI (US); Erik J. Christen, Royal Oak, MI (US); Kevin James Rhodes, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/381,771

(22) Filed: Apr. 11, 2019

(65) Prior Publication Data

US 2020/0324778 A1    Oct. 15, 2020

(51) Int. Cl.
*G08G 1/09*   (2006.01)
*B60W 40/06*  (2012.01)
(Continued)

(52) U.S. Cl.
CPC ......... *B60W 40/06* (2013.01); *G01C 21/3415* (2013.01); *G01S 17/89* (2013.01);
(Continued)

(58) Field of Classification Search
CPC .. B60W 40/06; B60W 50/14; B60W 2550/12; B60W 2400/00; B60W 2550/14; B60W 2550/402; B60W 30/18009; B60W 50/0098; B60W 2050/143; B60W 2050/146; B60W 2510/068; B60W 2530/20; B60W 2550/00; B60W 2550/10; B60W 40/02; B60G 17/0165; B60G 17/00; B60G 17/0195; B60G 2400/52; B60G 2401/142; B60G 2500/30; B60K 15/035; B60K 2015/03561; B60K 2015/03566; B60K 2015/0358; B60K 28/10; B60Y 2200/42; B60Y 2306/13; E02B 3/127; E02B 3/06; E02B 3/066; E02D 5/04; E02D 7/18; E02D 23/02; E02D 27/18; E02D 29/02; E02D 29/0233; G01B 21/18; G01C 21/36; G01C 21/3415; G01C 21/3697;
(Continued)

(56) References Cited

U.S. PATENT DOCUMENTS 5,642,673 A * 7/1997 Lucky, Sr. .............. B60F 1/043
                                                 104/279
8,000,887 B2 * 8/2011 Nathan ............ G08G 1/096811
                                                 701/117
(Continued)

FOREIGN PATENT DOCUMENTS

CN           103971529 A     8/2014

*Primary Examiner* — Daniel Previl
(74) *Attorney, Agent, or Firm* — Michael Spenner; Brooks Kushman PC

(57) ABSTRACT

A vehicle includes a controller, programmed to responsive to detecting, via a vehicle sensor, an obstacle blocking a route on which the vehicle is traversing, report the obstacle and blockage to a server via a wireless connection; responsive to receiving a command from the server instructing to perform an exploratory maneuver to remove the obstacle from the route, execute the command via an autonomous driving controller; and report an implementation result of the exploratory maneuver to the server.

16 Claims, 3 Drawing Sheets

(51) Int. Cl.
*G06K 9/00* (2006.01)
*G01C 21/34* (2006.01)
*G01S 17/89* (2020.01)
*G08G 1/0967* (2006.01)
*G08G 1/00* (2006.01)

(52) U.S. Cl.
CPC ... *G06K 9/00805* (2013.01); *G08G 1/096708* (2013.01); *G08G 1/202* (2013.01); *B60W 2552/00* (2020.02); *B60W 2554/00* (2020.02); *B60W 2555/20* (2020.02)

(58) Field of Classification Search
CPC ........ G01S 17/88; G01S 13/931; G01S 15/88; G01S 15/931; G01S 17/936; G01S 2013/9364; G01S 2013/9367; G01S 2013/9375; G01S 7/412; G05D 1/0214; G05D 1/0055; G05D 1/0061; G05D 2201/0213; G08G 1/00; G08G 1/133; G21C 15/18; G21C 9/012; Y02E 30/40; B60C 23/04; F04D 13/086; F04D 15/0218; G06K 9/00791; G06Q 10/06315; G06Q 50/06; Y02A 10/46; Y02A 20/402; Y04S 10/54
USPC ........ 340/901, 905, 902–903, 907, 988, 932
See application file for complete search history.

(56) References Cited

U.S. PATENT DOCUMENTS

| | | | |
|---|---|---|---|
| 9,905,133 B1* | 2/2018 | Kumar | G05D 1/0088 |
| 2014/0277900 A1* | 9/2014 | Abhyanker | G06Q 10/10 701/25 |
| 2015/0248131 A1* | 9/2015 | Fairfield | G05D 1/0038 701/2 |
| 2015/0344136 A1* | 12/2015 | Dahlstrom | B64C 39/024 701/3 |
| 2017/0137223 A1* | 5/2017 | Lert, Jr. | B65G 1/065 |
| 2019/0351911 A1* | 11/2019 | Anezaki | B60W 40/06 |

* cited by examiner

EMERGENCY ROUTE PLANNING SYSTEM

TECHNICAL FIELD

The present disclosure generally relates to a vehicle emergency route planning system. More specifically, the present disclosure relates to an emergency route planning system utilizing autonomous vehicles (AVs).

BACKGROUND

Before, during, and after natural or man-made disasters such as hurricanes, wildfires, tornadoes, cyclones, or potential armed conflicts, civilians usually need to be evacuated. During the emergency, many factors may negatively affect the efficient implementation of the evacuation process. For instance, highways may have debris or abandoned vehicle blocking efficient travel. Traffic may slow down due to the number of travelling vehicles. Air could be filled with smoke caused by wildfires. Effective emergency route planning based on live and accurate road condition data is crucial.

SUMMARY

In one or more illustrative embodiment of the present disclosure, a vehicle includes a controller, programmed to responsive to detecting, via a vehicle sensor, an obstacle blocking a route on which the vehicle is traversing, report the obstacle and blockage to a server via a wireless connection; responsive to receiving a command from the server instructing to perform an exploratory maneuver to remove the obstacle from the route, execute the command via an autonomous driving controller; and report an implementation result of the exploratory maneuver to the server.

In one or more illustrative embodiment of the present disclosure, a vehicle includes a controller, programmed to responsive to detecting a predefined road condition on a route via a vehicle sensor, report the road condition to a server; responsive to receiving a command from a server instructing to perform an exploratory maneuver, execute the command; and report an implementation result of the exploratory maneuver to the server, wherein the road condition includes at least one of: a road blockage, a flood, or a fire.

In one or more illustrative embodiment of the present disclosure, A cloud server includes a processor, programmed to responsive to receiving a road condition reported by a vehicle, analyze the road condition based on data collected via sensors of the vehicle; responsive to confirming the vehicle is unable to overcome the road condition, flag the road condition in a database, and load map data including geographic information nearby the location of the road condition; responsive to verifying a possible off-roading option bypassing the road condition, instruct the vehicle to explore the off-roading option; and responsive to receiving data from the vehicle indicative of the vehicle successfully traversed the off-roading option, mark the off-roading option as an alternative route for further reference.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes an AV system for emergency situations. More specifically, the present disclosure proposes a system utilizing AVs as sacrificial vehicles to explore routes.

Figure 1:
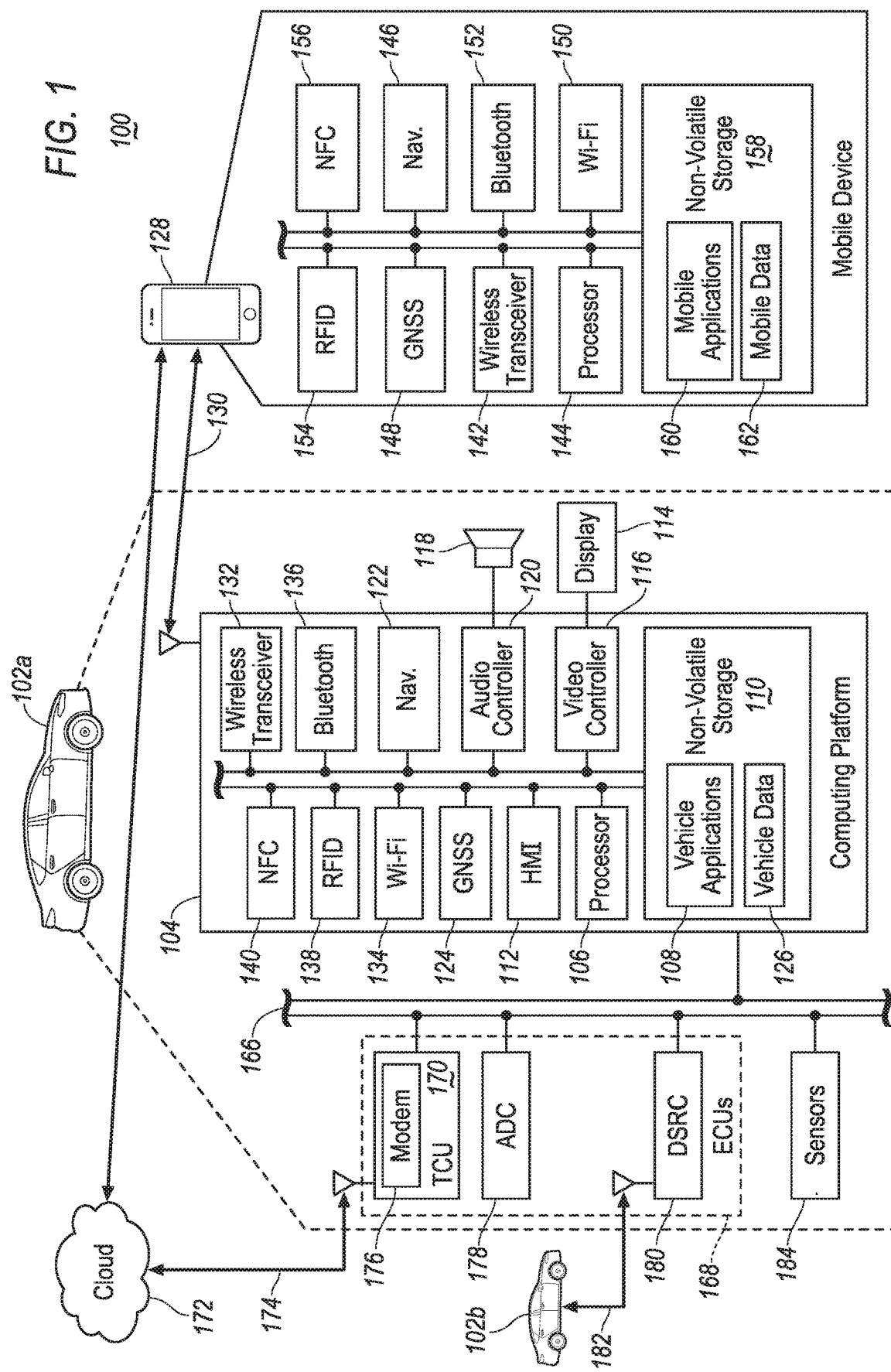
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102a may include various types of automobile, crossover utility vehicle (CUV), sport utility vehicle (SUV), truck, recreational vehicle (RV), boat, plane, or other mobile machine for transporting people or goods. In many cases, the vehicle 102a may be powered by an internal combustion engine. As another possibility, the vehicle 102a may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, route planning, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102*a*. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102*a*. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 142 of the mobile device 128.

The computing platform 104 may be further configured to communicate with various components of the vehicle 102*a* via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various ECUs 168 of the vehicle 102*a* configured to perform various options. For instance, the computing platform may be configured to communicate with a TCU 170 configured to control telecommunication between vehicle 102*a* and a cloud 172 through a wireless connection 174 using a modem 176. The wireless connection 174 may be in the form of various communication network e.g. a cellular network. The term cloud is used as a general term in the present disclosure and may include any computing network involving computers, servers, controllers or the like configured to store data and perform data processing functions and facilitate communication between various entities.

The ECUs 168 may further include an autonomous driving controller (ADC) 178 configured to monitor and control the autonomous driving features of the vehicle 102*a*. Some autonomous driving feature may include lane keep assist, safe distance from other vehicles, cruise control, hands-off-wheel alert, autobraking, brake mitigation with multiple sensitivity levels or the like. The ECUs 168 may further include a dedicated short-range communication (DSRC) controller 180 configured to communicate with one or more digital entities such as a fleet vehicle 102*b* via a DSRC link 182. Alternatively, the vehicle 102*a* may be configured to communicate with the fleet vehicle 102*b* via wireless connections enabled by the wireless transceiver 132 using other types of connections such as Wi-Fi or the like.

The computing platform 104 may be further configured to communicate with various sensors 184 via the in-vehicle network 166. The sensors 184 may be include various types of sensors configured to perform various detections. As a few non-limiting examples, the sensors 184 may include one or more cameras configured to capture images inside the vehicle cabin or of the vicinity of the vehicle 102*a*. The camera 184 may be located behind the windshield of the vehicle 102*a* facing forward to capture an image in front of the vehicle 102*a*. Alternatively, the front-facing camera 184 may be installed elsewhere, such as on the grille, inside the engine bay or on top of the vehicle 102*a*. Additionally or alternatively, the camera 184 may be located at the back of the vehicle 102*a* to function as a backup camera. Additionally or alternatively, the camera 184 may be a surrounding view camera including multiple camera sensors configured to capture multiple images around the vehicle 102*a* and generate a surrounding view around the vehicle 102*a*. The camera 184 may be configured to switch on automatically, e.g., responsive to the start/activation of the vehicle 102a. Alternatively, the camera 184 may be manually switched on/off by a vehicle user using the input device by way of the HMI controls 112. The image data captured by the camera 184 may be fed into the computing platform 104 via the in-vehicle network 166 and processed by the processor 106 using software 108. Additionally, the image data captured by the camera 184 may be uploaded to the cloud 172 via the TCU 170 for analysis and recording purposes.

The sensors 184 may further include one or more ultrasonic sensors installed on the body of the vehicle 102a (e.g. on the front/rear bumper) configured to detect objects within their range and calculate the distance from the objects. The sensors 184 may further include a radar sensor configured to detect object detect object within a predefined range from the vehicle 102a to facilitate distance measurement by the computing platform 104. The radar sensor 184 may have a longer range than the ultrasonic sensors 184 and may be configured to detect metal object only. The sensors 184 may further include a lidar sensor configured to detect and measure objects within a predefined range from the vehicle 102a. The lidar sensor 184 may be configured to function substantially in the same way as the radar sensor 184 operates, but the lidar sensor may remove the requirement for the object to be metal. The sensors 184 may further include an air quality sensor configured to measure air quality surrounding the vehicle 102a. The air quality sensor 184 may be useful in situations such as wildfire, to determine if the air quality is safe for human respiration and thus to determine a road in a particular area is safe for vehicles carrying passengers to drive through.

Figure 2:
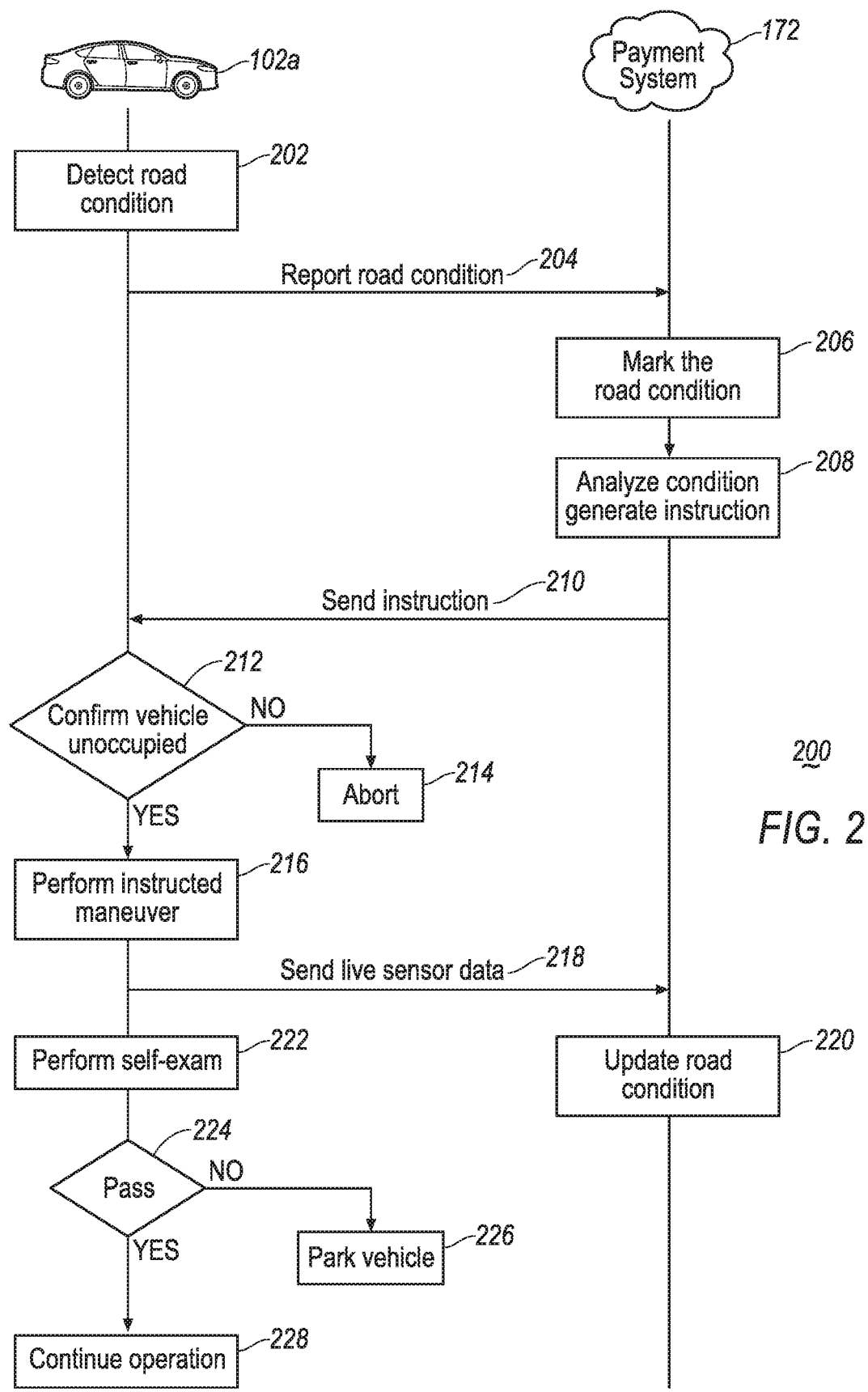
FIG. 2 illustrates an example flow diagram for a process of one embodiment of the present disclosure.

Referring to FIG. 2, an example flow diagram for a process 200 of one embodiment of the present disclosure is illustrated. In the present example, the vehicle 102a may be an autonomous vehicle operated by the ADC 178 using instructions received from the cloud 172 to perform various missions during an emergency situation (e.g. a natural disaster). The vehicle 102a may be provided with an emergency evacuation feature configured to pick up and evacuate passengers under the coordination of the cloud 172. At operation 202, while operating on an evacuation route, the vehicle 102a detect a road condition on the route via sensors 184 and determines the vehicle 102a may not safely pass the road condition without further evaluation. For instance, the road condition may include any potential dangerous or hazardous condition to the vehicle 102a or the passengers such as flood/deep water, obstacles (e.g. abandoned vehicles), heavy smoke or the like. At operation 204, the vehicle 102a sends data collected by the sensors 184 to report the road condition to the cloud 172 associated with autonomous vehicles dispatch. The sensor data may include an image/video of the road condition. Additionally, the vehicle 102a may perform initial measurements to the road condition such as by evaluating the size of the obstacle using image processing application 108, or measure the depth of water using lidar sensors, and then send the initial measurements along with the sensor data to the cloud 172 for further analysis. Responsive to receiving the sensor data, at operation 206, the cloud records the road condition and mark the road/street as unpassable in a road network/traffic database, so that no further traffic is directed to that reported road. Next, at operation 208, the cloud 172 analyze the sensor data as well as the initial measurement (if provided) to evaluate the situation and generate driving instructions to the vehicle 102a. Depending on the evaluation results, there may be three types of instructions that the cloud 172 may provide to the vehicle 102a. If the cloud 172 determines the vehicle 102a cannot overcome the road condition, an alternatively route may be provided to the vehicle 102a. Alternatively, the cloud 172 may instruct the vehicle 102a to stay at the current location and wait for help to arrive, while informing the authority (e.g. fire department) about the condition. Otherwise, if the cloud 172 determines the vehicle 102a has a reasonable chance to overcome/remove the road condition, at operation 210, the cloud 172 sends driving instructions to the vehicle 102a to take exploratory maneuvers. For instance, the exploratory maneuvers may include running into the obstacle to remove it from the road; drive into the water to test the depth, take off-roading to explore unpaved paths, or the like.

The exploratory maneuvers, by their nature, may be dangerous and the vehicle 102a may be configured to only apply implement the exploratory maneuvers while unoccupied. At operation 212, the vehicle 102a verifies if the vehicle is unoccupied. There are various methods to verify the occupancy of the vehicle 102a. For instance, to vehicle 102a may use seat sensors and/or interior cameras to verify the vehicle occupancy. Alternatively, the vehicle 102a may pop up visual/audio message via the HMI controls 112 asking any user to confirm his/her presence in the vehicle cabin within a predefined time. If the vehicle 102a detects any passenger in the vehicle 102a, the vehicle 102a aborts the exploratory maneuver at operation 214. Otherwise, the process proceeds to operation 216 and ADC 178 performs the exploratory maneuver by the driving instruction received from the cloud 172. While performing the exploratory maneuver, the vehicle 102a may be configured to send sensor data (e.g. image/video) collected by various sensors 184 to the cloud 172 in a real-time manner to keep the cloud 172 updated about the situation. Responsive to receiving the sensor data, at operation 220, the cloud 172 analyze the sensor data to determine if the vehicle 102a successfully overcome the road condition. For instance, the sensor data may indicate the vehicle 102a successfully pushed the obstacle away making enough room for vehicles to pass. Additionally or alternatively, the sensor data may indicate the vehicle 102a successfully passed the water suggesting the water depth is safe for vehicle travelling. Additionally or alternatively, the sensor data may include location data from the GNSS controller 124 indicating the vehicle 102a successfully explored an unpaved path. The sensor data may further include air quality data collected by the air quality sensor 184 to measure air quality such as smoke level to determine if the unpaved path is safe for human respiration. The cloud 172 updates the road condition in the road network database accordingly at operation 220. Responsive to successfully performing the exploratory maneuver, at operation 224, the vehicle 102a performs a predefined self-examination to verify if the vehicle 102a is in good condition to perform further missions. Due to the sacrificial nature of the maneuvers, the vehicle 102a may suffer from damages while performing the exploratory maneuvers. If the vehicle fails the self-examination indicating the vehicle is damaged and unable to perform further missions, the process proceeds to operation 226 and ADC 178 parks the vehicle 102a. Otherwise, if the vehicle 102a is still in good condition, the process proceeds to operation 228 and the vehicle 102a continues to perform various missions.

Figure 3:
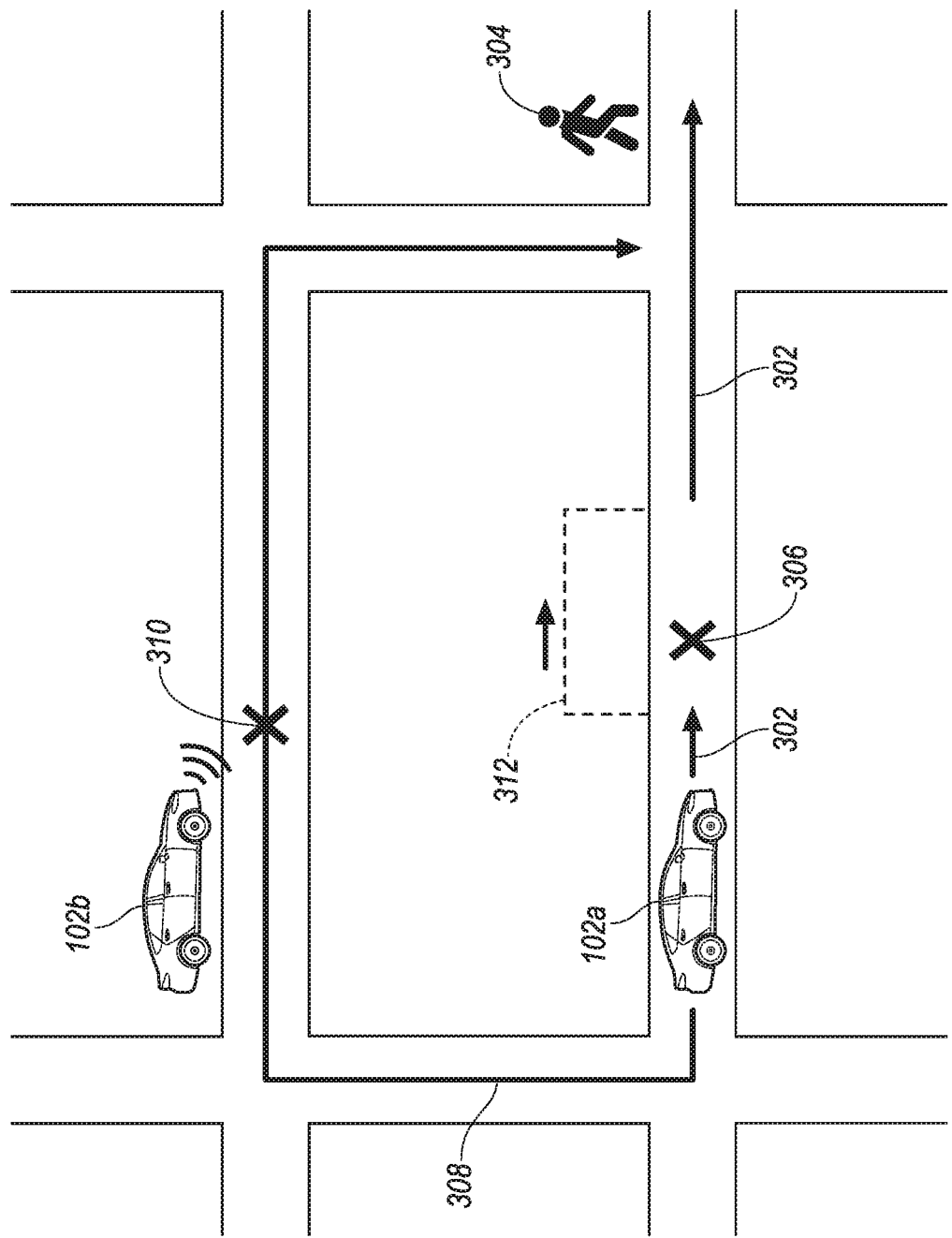
FIG. 3 illustrates an example schematic diagram of one embodiment of the present disclosure.

The operations of the process 200 may be applied to various situations. For instance, with reference to FIG. 3, an example schematic diagram of one embodiment of the present disclosure is illustrated. In the present example, the vehicle 102a is an autonomous vehicle provided with the emergency evacuation feature and instructed by the cloud 172 to pickup a passenger 304 at a predefined location to escape a natural disaster (e.g. wildfire). While on the route 302 to pickup the passenger 304, the vehicle 102a detects a road condition via sensors 184. For instance, the road condition may be an obstacle blocking the route 302. The vehicle 102a may perform an initial evaluation of the road condition e.g. to evaluate the size of the obstacle and any available room for passing. The initial evaluation may suggest there is not enough room to pass the obstacle e.g. using the road curb or the like. The vehicle 102a may report the road condition 306 to the cloud 172 by sending out sensor data along with the initial evaluation result. The cloud 172 may analyze the received data to determine options for the vehicle 102a. For instance, the cloud 172 may plan an alternative route 310 to reach the pickup location of the passenger 304. However, there may be a second road condition 310 on the alternative route 310 reported by a fleet vehicle 102b or by an infrastructure (e.g. a traffic camera).

The cloud 172 may seek exploratory maneuvers as alternative options responsive to verifying no other route is practically available. The available exploratory maneuvers may be dependent on the types of road conditions. As a few non-limiting examples, if the detected road condition 306 is an obstacle blocking the route, available exploratory maneuvers may include pushing the obstacle off the road. If the road condition is flooding, the available exploratory maneuvers may include driving into the water to measure the depth. Alternatively, the driving condition may further include heavy smoke caused by wildfire impairing visibility and air quality. In this case, the exploratory maneuver may further include taking off-roading to explore unpaved road to avoid the smoke, or running over crops to reduce the growth of the fire. Alternatively, the exploratory maneuver of taking off-roading to explore unpaved road may also be an option for other types of road conditions if the nearby terrain condition allows to do so. Taking the obstacle road condition for instance, the cloud 172 may evaluate the possibility of pushing the obstacle off the road by evaluating the size of the obstacle using sensor data received. If the cloud evaluation result suggests the vehicle 102a may be able to push the obstacle off the road, the cloud 172 may instruct the vehicle 102a to do so. Different autonomous vehicles may differ in size and pushing capability. The cloud 172 may coordinate the whole exploratory maneuver process by sending fleet vehicle having better pushing capability to conduct the exploratory maneuver. The fleet vehicle may be heavier and equipped with pushing equipment (e.g. a push bar) so the evacuation system as a whole may have a better chance to succeed. Alternatively, instead of attempting to remove the obstacle from the route, the cloud 172 may be configured to instruct the vehicle 102 to explore an unofficial alternative route 312 to bypass the road condition 306. The cloud 172 may connect a map database and obtain surrounding information (e.g. terrain, or buildings) around the route 302 to find possible off-roading possibilities. For instance, the cloud 172 may determine route 312 as an off-roading possibility to get around the road condition 306.

Responsive to receiving instructions from the cloud to take the exploratory maneuver, the vehicle 102a may implement the instructions while constantly send vehicle sensor data to the could 172 to provide live update for the exploratory maneuver. The vehicle 102a may send location data to the cloud 172 to inform if it successfully passed the instructed off-road route 312 so that other vehicles may take the same route 312. Alternatively, the vehicle 102a may successfully push the obstacle off the road and clear the road condition. To continue the journey, the vehicle 102a may need to go through a self-examination process to verify no significant damage has been cause during the exploratory maneuver. This is particular the case when the exploratory maneuver involves pushing obstacles or driving through flooded areas. If the vehicle 102a passes the self-examination, the vehicle 102a may be instructed to continue the route 302 to pick up the passenger 304. Otherwise, if the vehicle 102a is damaged and unable to complete the mission, the vehicle 102a may pull over to somewhere that does not obstacle the road and inform the cloud 172 about the current status. The cloud 172 may send alternative vehicles to pickup the passenger 304.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle, comprising:
    a controller, programmed to
        responsive to detecting, via a vehicle sensor, an obstacle blocking a route on which the vehicle is traversing, report the obstacle and blockage to a server via a wireless connection,
        responsive to receiving a first command from the server instructing to perform an exploratory maneuver to remove the obstacle from the route, verify the vehicle is unoccupied, and execute the first command via an autonomous driving controller,
        report an exploratory maneuver result indicative of a failure to remove the obstacle from the route to the server,
        responsive to receiving a second command from the server instructing to explore an off-roading option bypassing the obstacle, execute the second command via the autonomous driving controller, and
        report an off-roading result indicative of a successful traversing of the off-roading option to the server.

2. The vehicle of claim 1, wherein the controller is further programmed to
    output a message via a human-machine interface controls to invite input from an occupant of the vehicle, and
    verify there is no occupant in the vehicle responsive to detecting a predetermined time has lapsed without receiving any input.

3. The vehicle of claim 1, wherein the controller is further programmed to
    send data collected via the vehicle sensor to the server in a real-time manner while performing the exploratory maneuver.

4. The vehicle of claim 1, wherein the controller is further programmed to
perform a self-examination to detect damage of the vehicle after performing the exploratory maneuver.

5. A vehicle, comprising:
a controller, programmed to
responsive to detecting a predefined road condition on a route via a vehicle sensor, report the road condition to a server,
responsive to receiving a first command from a server instructing to perform an exploratory maneuver to overcome the road condition, verify the vehicle is unoccupied, and execute the first command, and
report an exploratory maneuver result indicative of a failure to overcome the obstacle from the route to the server,
responsive to receiving a second command from the server instructing to explore an off-roading option bypassing the obstacle, execute the second command, and
report an off-roading result indicative of a successful traversing of the off-roading option to the server,
wherein the road condition includes at least one of: a road blockage, a flood, or a fire.

6. The vehicle of claim 5, wherein the exploratory maneuver is to drive toward an obstacle blocking the route and push the obstacle away to open the route.

7. The vehicle of claim 5, wherein the exploratory maneuver is to drive through the flood to verify a depth of the flood.

8. The vehicle of claim 5, wherein the controller is further programmed to
verify an occupancy of the vehicle using data collected via a seat sensor and an interior camera.

9. The vehicle of claim 5, wherein the controller is further programmed to
responsive to detecting a predefined road condition, perform an initial evaluation of the road condition; and
send the initial evaluation to the server.

10. The vehicle of claim 9, wherein the initial evaluation includes measuring a size of an obstacle blocking the route using data collected from a lidar sensor.

11. The vehicle of claim 9, wherein the initial evaluation includes measuring air quality to verify if the air is suitable for human respiration using data collected from an air quality sensor.

12. The vehicle of claim 5, wherein the controller is further programmed to
send data collected via the vehicle sensor to the server in a real-time manner while performing the exploratory maneuver.

13. A cloud server, comprising:
a processor, programmed to
responsive to receiving a road condition reported by a vehicle, analyze the road condition based on data collected via sensors of the vehicle;
responsive to confirming the vehicle is unable to overcome the road condition, flag the road condition in a database, and load map data including geographic information nearby the location of the road condition;
responsive to verifying a possible off-roading option bypassing the road condition, instruct the vehicle to explore the off-roading option; and
responsive to receiving data from the vehicle indicative of the vehicle successfully traversed the off-roading option, mark the off-roading option as an alternative route for further reference.

14. The cloud server of claim 13, wherein the processor is further programmed to
instructing a second vehicle to drive toward the road condition to clear the road condition.

15. The cloud server of claim 14, wherein the processor is further programmed to
unflag the road condition in the database.

16. The cloud server of claim 13, wherein the processor is further programmed to
responsive to receiving road condition of smoke above a predefined threshold indicative of a wildfire near the vehicle, instruct multiple fleet vehicles to run over a crop field near the vehicle.

* * * * *